United States Patent [19]

Erickson

[11] Patent Number: 5,474,170
[45] Date of Patent: Dec. 12, 1995

[54] CD HOLDER AND DISPLAY ARRAY

[75] Inventor: Kenneth D. Erickson, Anoka, Minn.

[73] Assignee: Team Vision, Inc., Anoka, Minn.

[21] Appl. No.: 272,773

[22] Filed: Jul. 8, 1994

[51] Int. Cl.$^6$ ................................. B65D 85/57
[52] U.S. Cl. ................... 206/44 R; 206/308.1; 220/23.4
[58] Field of Search ............ 206/44, 309, 310, 206/387, 444, 308.1, 387.1; 211/40, 41, 81; 220/23.4; 53/449, 473; 29/428

[56] References Cited

U.S. PATENT DOCUMENTS

| | | | |
|---|---|---|---|
| D. 239,467 | 4/1976 | den Ouden | D61/1 N |
| 2,261,806 | 11/1941 | Hills | 206/309 |
| 2,586,176 | 2/1952 | Olsen | 40/152 |
| 2,958,971 | 11/1960 | Plettner | 40/152 |
| 3,339,302 | 9/1967 | Mallory | 40/152 |
| 3,647,074 | 3/1972 | Talmadge | 211/40 |
| 4,702,369 | 10/1987 | Philosophe | 206/312 |
| 4,807,749 | 2/1989 | Ackeret | 206/387 |
| 4,860,897 | 8/1989 | Fowler et al. | 206/444 |
| 4,875,743 | 10/1989 | Gelordi et al. | 312/13 |
| 4,889,254 | 12/1989 | Vola | 220/23.4 |
| 4,892,189 | 1/1990 | Kunimune et al. | 206/232 |
| 4,940,147 | 7/1990 | Hunt | 211/40 |
| 4,951,826 | 8/1990 | Tompkins | 211/40 |
| 5,040,687 | 8/1991 | Whittington | 211/40 |
| 5,048,680 | 9/1991 | Fitzpatrick | 206/309 |
| 5,072,836 | 12/1991 | Gross | 211/40 |
| 5,097,946 | 3/1992 | Emrich | 206/45.11 |
| 5,101,586 | 4/1992 | Zennedjian | 40/152.1 |
| 5,172,817 | 12/1992 | Gross | 211/40 |
| 5,180,058 | 1/1993 | Hu | 206/309 |
| 5,232,089 | 8/1993 | Kim | 206/309 |
| 5,261,534 | 11/1993 | Krebs et al. | 206/310 |
| 5,293,992 | 3/1994 | Warner | 206/309 |
| 5,320,244 | 6/1994 | Yu | 220/507 |
| 5,344,028 | 9/1994 | Angele | 211/40 |
| 5,346,074 | 9/1994 | Overholser | 211/40 |
| 5,351,835 | 10/1994 | Hallgren | 211/40 |
| 5,375,706 | 12/1994 | Perez | 206/309 |

*Primary Examiner*—Steven N. Meyers
*Assistant Examiner*—Tara L. Laster
*Attorney, Agent, or Firm*—Nawrocki, Rooney & Sivertson

[57] ABSTRACT

Apparatus for holding a disc cartridge. The holding apparatus may be assembled with a plurality of other holding apparatus to form an array for use in a disc display. Discs may be removed from a disc cartridge without removing the cartridge from the array.

7 Claims, 6 Drawing Sheets

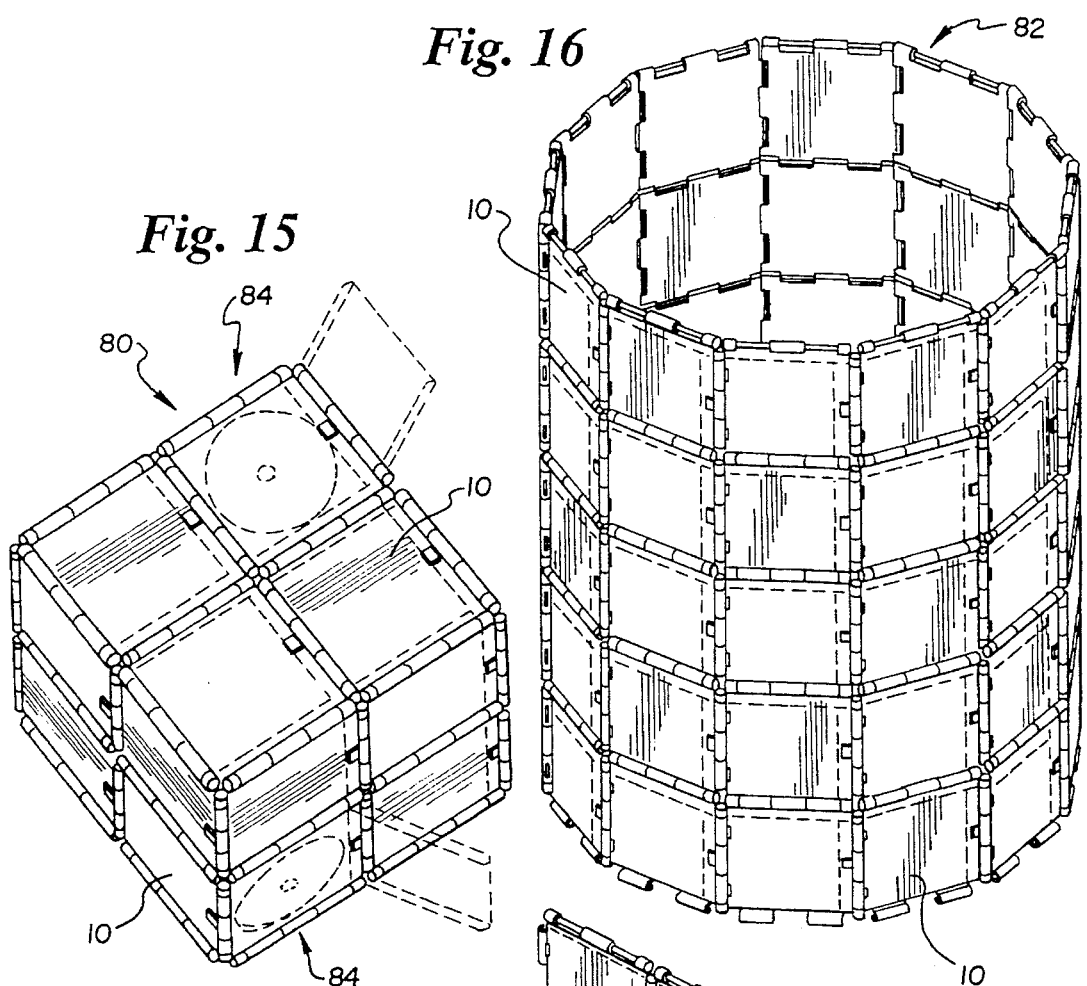
Fig. 15
Fig. 16
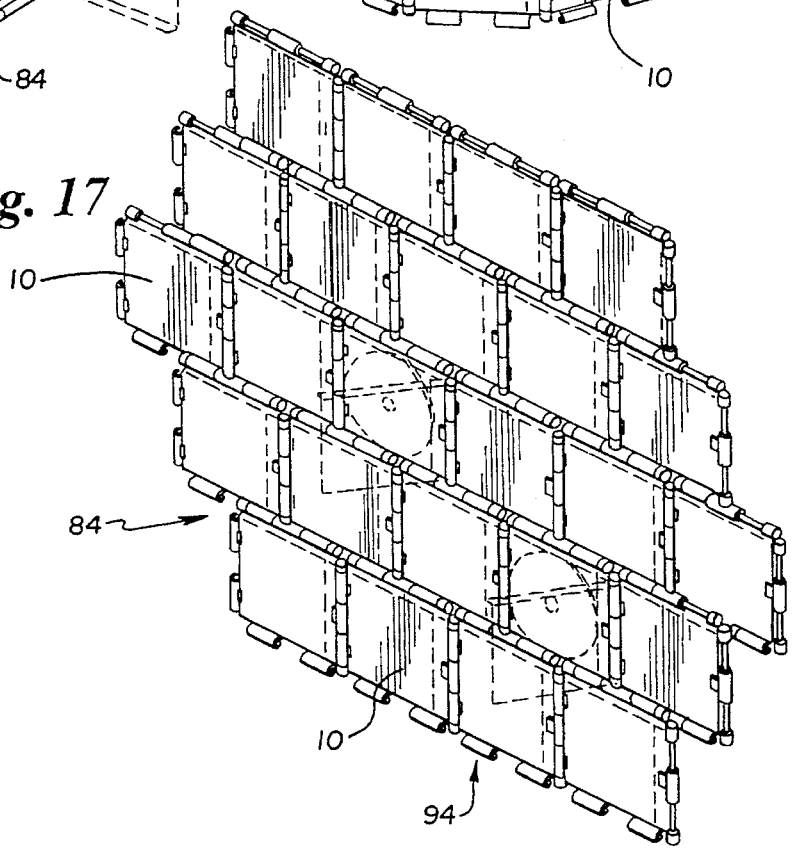
Fig. 17

CD HOLDER AND DISPLAY ARRAY

FIELD OF THE INVENTION

The present invention relates to disc holders. In particular, the present invention relates to an apparatus for holding a compact disc cartridge, which is capable of mating with a plurality of other compact disc cartridge holders to form an array for use in a compact disc display.

BACKGROUND OF THE INVENTION

There is an increasing need for holders which store discs, such as compact discs, computer diskettes, CD/ROM discs and other similar storage mediums. In particular, there is a need for convenient storage of compact discs which may also be used as a display device.

Compact discs have become increasingly popular in recent years. Compact discs have replaced phonographic albums and tape cassettes as the preferred medium for audio storage. Additionally, compact discs have broad applications as a storage medium, being able to store video, computer and other data.

Compact discs are stored in a plastic cartridge, as opposed to a traditional record sleeve. The plastic cartridge includes a hinged front cover for opening the cartridge to access the compact disc. The front cover itself includes tabs for holding information regarding the compact disc stored within the cartridge. The cartridge, including the cover, is typically formed of clear plastic, allowing a user to read information regarding the compact disc without opening the cartridge cover.

With the increasing popularity of compact discs has come a need for efficient storage of the compact disc cartridge while allowing access to the compact disc itself. Compact discs are much smaller than a traditional phonographic album, and therefore, take up less storage space.

In general, present compact disc holders include storage devices which allow the compact discs to be stacked, or which store compact discs in individual compartments located on a common board or common plane. Both types of compact disc holders require that compact disc cartridges be removed from the holder in order to access the compact disc. These types of holders are used for personal use and in compact disc displays.

One known CD storage device includes a unitary holder which is able to hold two CD cartridges. The unitary holder may connect with other unitary holders to hold compact discs in a stacked configuration. To access a given compact disc, the stack may be opened, pivoting a holder about its hinge, allowing the compact disc cartridge to be removed from the holder for accessing the compact disc.

Other types of compact disc holding devices include compartments for storing individual compact discs in a common plane. The holding devices are formed in one structural unit. The holding devices allow a user to read the front cover of the compact disc to aid in selecting a compact disc for use. This type of compact disc storage device typically holds four or more individual compact disc cartridges.

The common plane compact disc storage devices are formed as a rigid structure being adaptable for use as wall-mounted compact disc displays. Additionally, such display boards suggest various methods of securing a compact disc cartridge to the compact disc storage device, such as through the use of hook and loop fasteners adhered to the back side of a compact disc cartridge, or alternatively, include an array of compartments where a compact disc cartridge is secured in a given compartment through the use of protruding tabs. The common plane compact disc storage devices are most commonly used as compact disc displays, with various modifications being made for storage applications in three-ring notebooks, racks and cases similar to storage of a traditional photographic album.

Present compact disc storing devices are limited in use for displaying an array of compact discs. The stack or storage rack compact disc holders require a consumer to read the edge of the compact disc cartridge to determine information regarding the disc stored within the cartridge. The compact disc cartridge must be removed from the storage rack to view the information cover and to remove the disc from the storage rack.

Although common plane compact disc storage devices allow a user to view the compact disc cover, the compact discs are limited to being stored in groups on a rigid, flat board-like surface. The compact disc displays must be wall-mounted or require other additional support. Such devices are not useable in a compact disc storage display which requires the compact disc storage device to take on additional geometric forms or for locating a compact disc cartridge display in areas other than wall mounted displays, such as free-standing displays. Additionally, the present compact disc storage displays are restricted in allowing ready access to a compact disc located within the compact disc holder.

SUMMARY OF THE INVENTION

The present invention is an apparatus for holding a disc cartridge. The holding apparatus may be assembled with a plurality of other holding apparatus to form a disc holder array.

The apparatus for holding a disc cartridge includes a housing for receiving an individual disc cartridge. The housing has the ability to retain the disc cartridge therewithin. Means are included as part of the housing for mating the disc cartridge holding apparatus with a plurality of other disc cartridge holding apparatus. The mated holders can be orientated with respect to one another a wide range of angles.

The apparatus is capable of holding many types of cartridges, including cartridges for use with compact discs, computer discs, CD ROM discs and the like. The apparatus housing includes a recessed area which is formed to hold the disc cartridge. When the disc cartridge is located within the housing recessed area, the disc cartridge is not precluded from being opened.

In one embodiment, the apparatus housing includes a latch mechanism which is formed integral with the housing. The latch mechanism is carried by the housing for retention of the disc cartridge within the housing recessed area. The latch mechanism retains the disc cartridge within the housing recessed area, while allowing the disc cartridge cover to be opened and the disc to be removed without removing the disc cartridge from the disc cartridge holding apparatus.

In one embodiment, the means for mating the disc cartridge holding apparatus with a plurality of other disc cartridge holding apparatus is formed integral with the housing. The mating mechanism includes at least one dowel and at least one snap, with a dowel and snap located on opposite edges of the apparatus housing. The dowel of one edge cooperates with the snap edge of another holding apparatus to mate the two holding apparatus together to form an array for personal use or in a compact disc display.

In a preferred embodiment, the latch mechanism includes a tab and clip devices. The tab and clip devices are located at opposite ends of the holding apparatus. The tab securely retains the edge of a compact disc in the holding apparatus recessed area, while the clip devices retain the opposite edge of the compact disc cartridge by clasping the compact disc cartridge housing. The latch mechanism allows the compact disc cartridge cover to be opened and closed, allowing access to the compact disc itself without removing the compact disc from the holding apparatus.

The holder is, typically, generally rectangular shaped and has a plurality of edges. The mating mechanism includes a plurality of dowels and snaps, the dowels and snaps being located on opposite edges of the housing. A dowel of one holder cooperates with the corresponding snaps of another holder for mating the two holders together. Particularly, the snaps fit over and roll around a corresponding mated dowel. Mated holders can be oriented with respect to each other at a wide range of angles.

Although in one embodiment the holder is rectangular shaped, it is recognized that the holder may take on a number of multi-edged shapes and forms. Additionally, the holder may be sized to hold similar cartridges for other devices, such as computer diskettes, CD/ROM discs, and other storage mediums.

A holding apparatus array can include a plurality of holders. The array of compact disc holders may be used as a compact disc display device. The array may take on a two-dimensional shape, such as that of a flat surface or board being contained within a single, common plane.

Alternatively, the compact disc display may take on various multi-dimensional shapes and geometrical forms which are free standing and do not require attachment to a vertical surface. For example, the array of mated holders may take on the shape of a cube-shaped box, or cylinder.

The present invention also includes a method of mating compact disc cartridges in an array to form a compact disc display, the method includes the steps of providing a plurality of housings, each housing being generally rectangular shaped and having a set of dowels and snaps located at opposite edges. Receiving a compact disc within a recess located within each housing is then effected. The compact disc is retained within each housing. Finally, the dowels of the housing are mated with the snaps of another housing to form an array, which may take on a multi-dimensional form.

BRIEF DESCRIPTION OF THE DRAWINGS

Other objects of the present invention and many of then attendant advantages of the present invention will be readily appreciated as the same becomes better understood by reference to the following detailed description when considered in connection with the accompanying drawings, in which like reference numerals designate like parts throughout the figures thereof and wherein:

FIG. 15 is a perspective view of a compound box formed by placing four compact disc holders in a square pattern on all sides of the box;

FIG. 16 is a perspective view of a compound assembly wherein the compact disc holder array forms a cylindrical column; and FIG. 17 is a perspective view of a compact disc holder array where the compact disc holders are located in a common plane and in a staggered pattern.

DETAILED DESCRIPTION OF THE PREFERRED EMBODIMENTS

The present invention is a holder for retaining a compact disc cartridge. The holder is capable of mating with a plurality of other compact disc cartridge holders to form an array for use in a compact disc display. The mated holders can be oriented with respect to one another at a wide range of angles.

Figure 1:
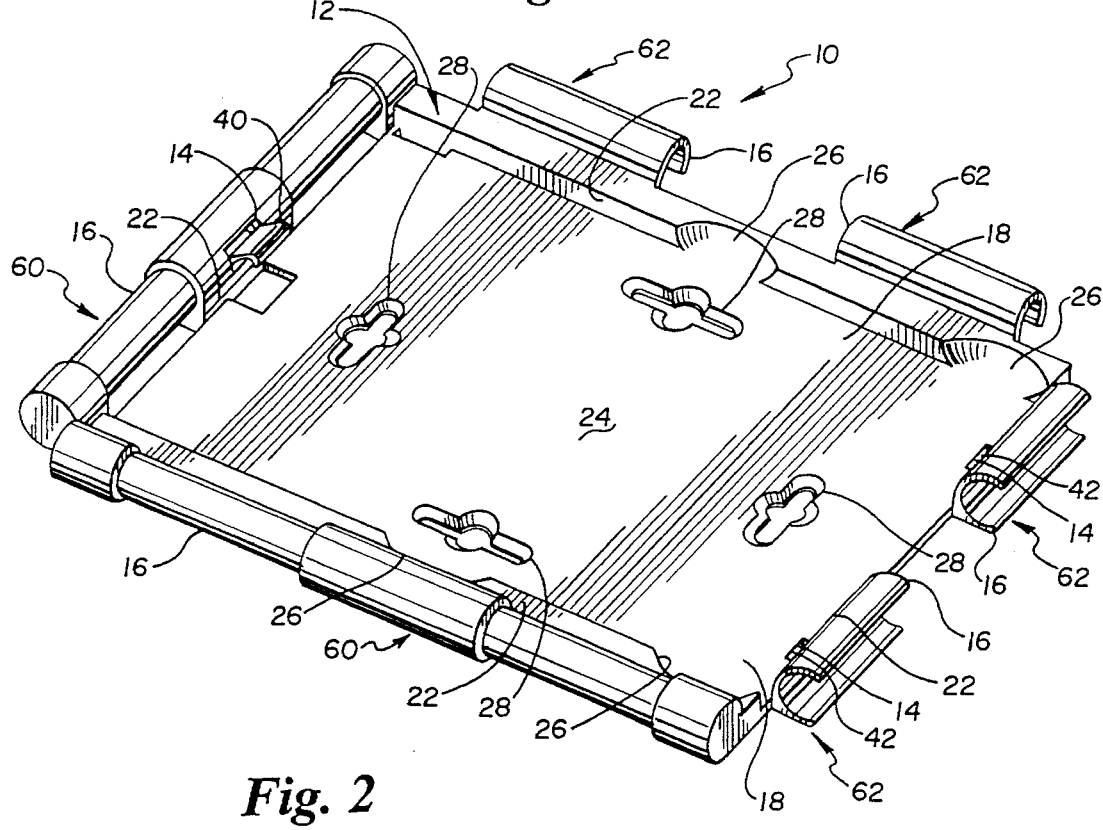
FIG. 1 is a perspective view of the compact disc holder of the present invention.

FIG. 1 shows a compact disc holder generally at 10. The compact disc holder 10 includes a housing 12, latching system 14, and mating devices 16. Latching system 14 releasably retains a compact disc within housing 12. Mating devices 16 allow compact disc holder 10 to mate with other compact disc holders to form a compact disc array for use as a display device.

Figure 2:
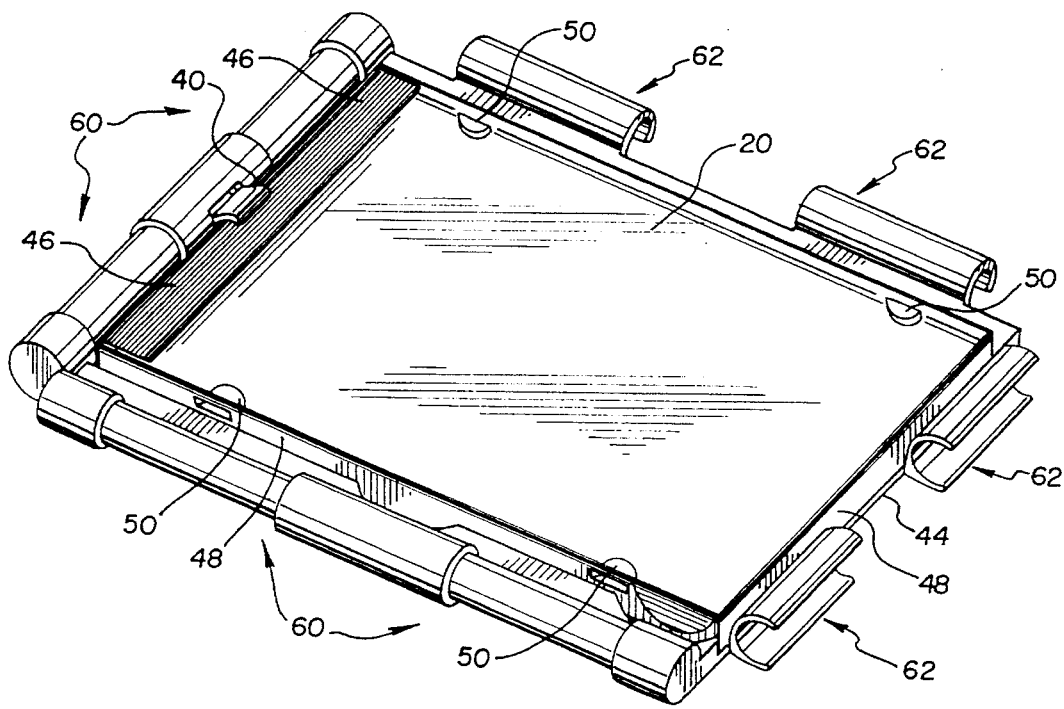
FIG. 2 is a perspective view of the compact disc holder of the present invention containing a compact disc cartridge.

Housing 12 includes a recessed area 18 for retaining a compact disc. FIG. 2 shows a compact disc cartridge 20 retained within housing 12. The recessed area 18 is sized such that a compact disc fits tightly within the recessed area.

Recessed area 18 is formed by side walls 22 and back plate 24. Back plate 24 has approximately the same surface area as compact disc cartridge 20, and side walls 22 are approximately the same height as the width of compact disc cartridge 20.

Side walls 22 include finger indentations 26 for easy opening of compact disc cartridge 20 when it is located within recessed area 18. Back plate 24 includes slots 28 for mounting compact disc holder 12 to a surface, such as a wall, with screws, for example.

Latching system 14 is used for retaining compact disc cartridge 20 within recessed area 18. Latching system 14 includes hinge tab 40 and clip devices 42. Compact disc holder 10, as shown in FIG. 1, is generally rectangular in shape. Hinge tab 40 extends from side wall 22 with clip devices 42 extending from an opposite section of side wall 22. Hinge tab 40 is sized to extend over an edge of a compact disc, while being able to be flexed relative to side wall 22 to aid in inserting and removing a compact disc from the compact disc holder 10.

FIG. 2 shows compact disc cartridge 20 located within compact disc holder 10. The compact disc cartridge 20 generally includes a cover 44, a rear edge 46, and a body 48. Compact disc cartridge 20 is typically formed of a clear, hard plastic for viewing materials contained within the compact disc cartridge. Cover 44 additionally includes tabs 50 which allow informational material to be inserted between the tabs 50 and the cover interior surface. The informational material can be read through the clear plastic cover and generally gives information regarding the medium contained on the compact disc within the compact disc cartridge, similar to a traditional album cover.

Figure 3:
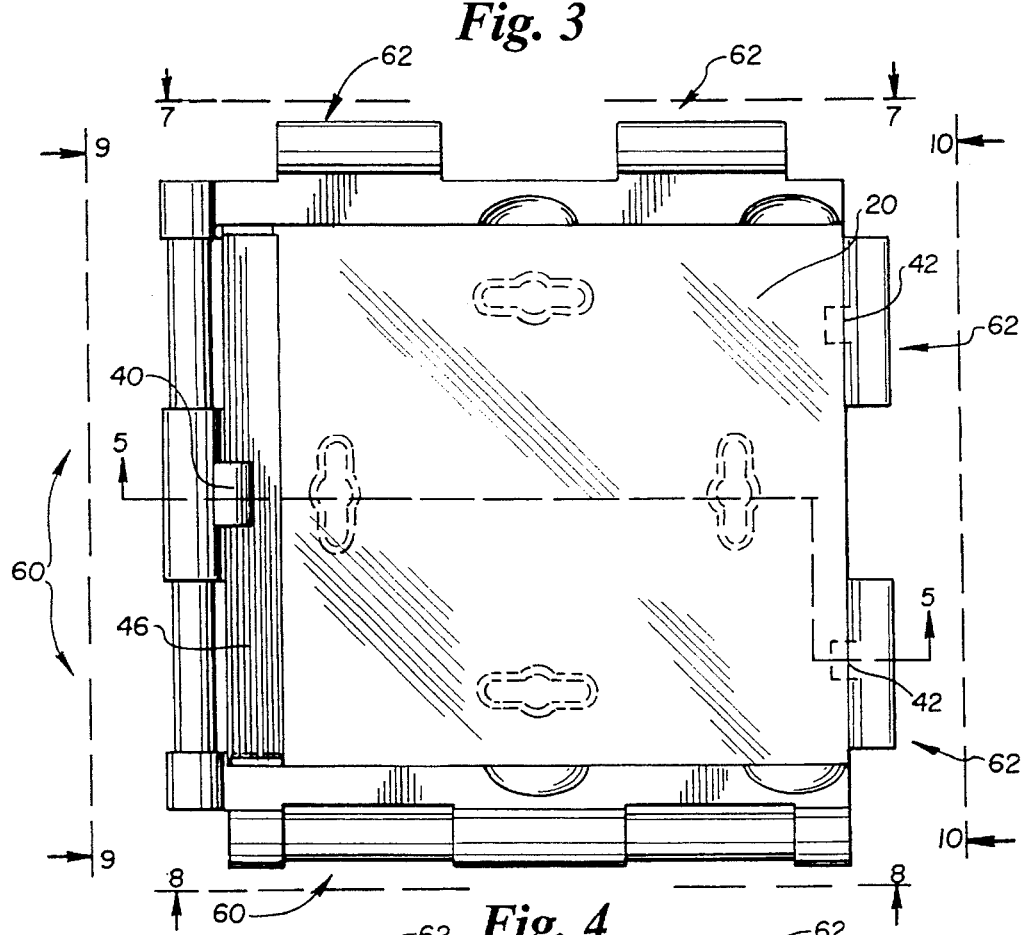
FIG. 3 is a top plan view of the compact disc holder of the present invention.
Figure 4:
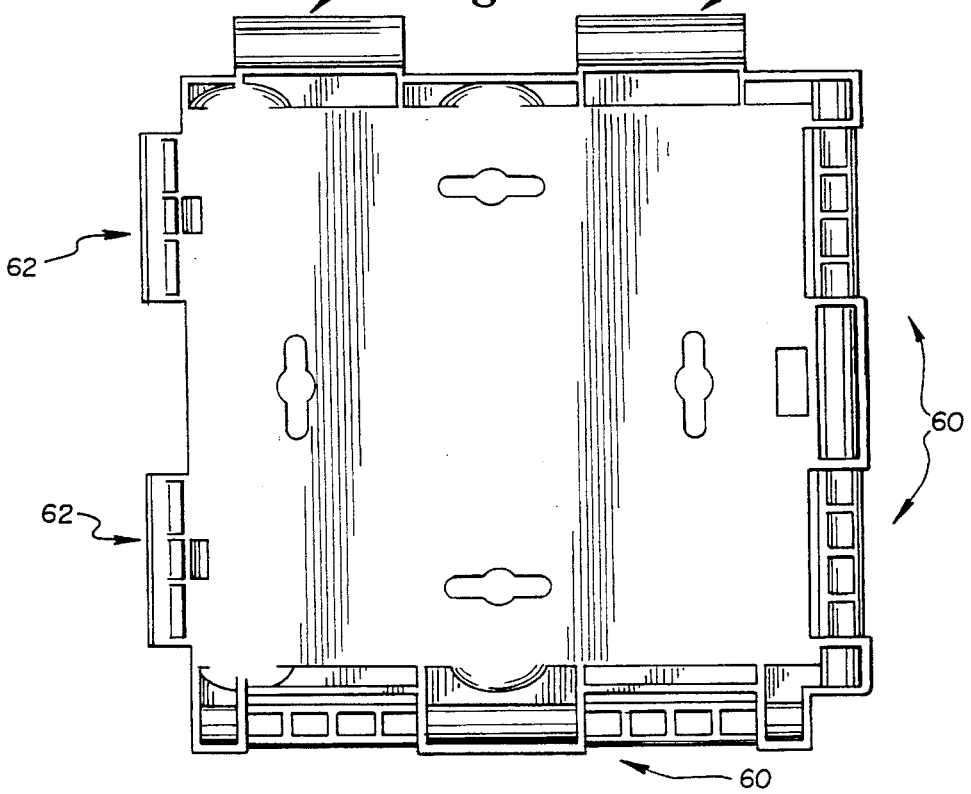
FIG. 4 is a bottom plan view of the compact disc holder of the present invention.

FIG. 3 is a top plan view of FIG. 2, and FIG. 4 is a bottom plan view of structure illustrated in FIG. 2 showing compact disc holder 10 with compact disc cartridge 20. As shown in FIGS. 2 and 3, when compact disc cartridge 20 is inserted within recessed area 18, hinge tab 40 extends at least partially over rear edge 46. Hinge tab 40 applies constant pressure against rear edge 46 for retaining compact disc cartridge 20 within recessed area 18.

Additionally, as shown in FIG. 3, clip devices 42 extend from side wall 22 to hold the opposite edge 48 of the body of compact disc cartridge 20.

Figure 6:
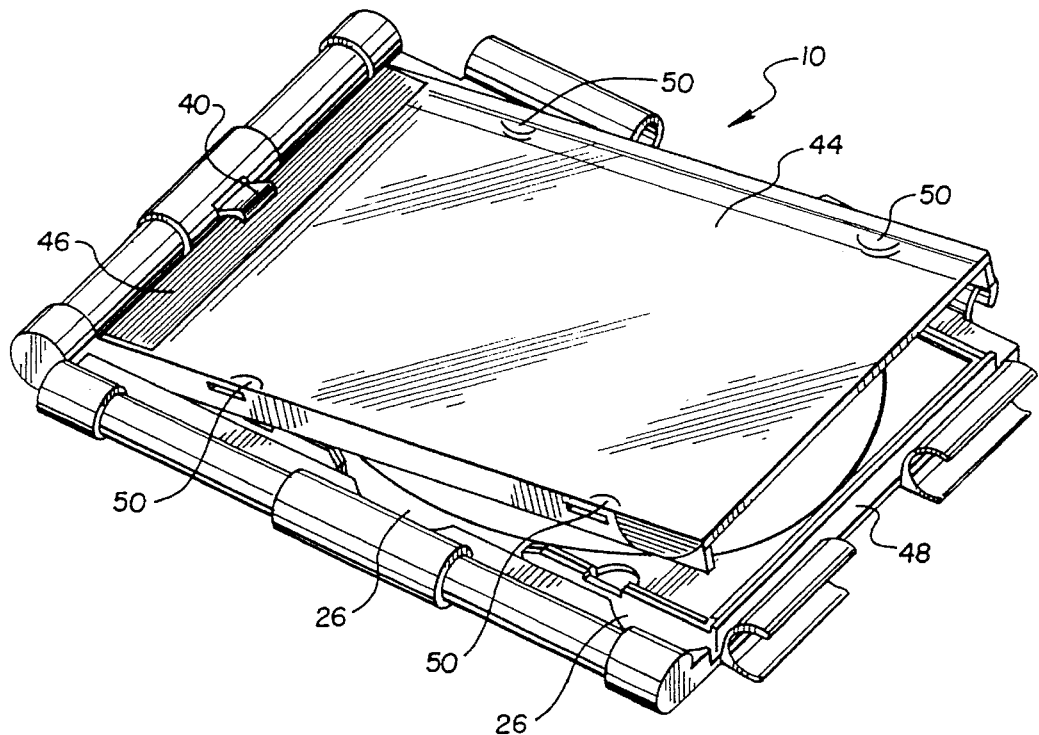
FIG. 6 is a perspective view thereof similar to that of FIG. 2 showing the compact disc cartridge cover opening.
Figure 5:
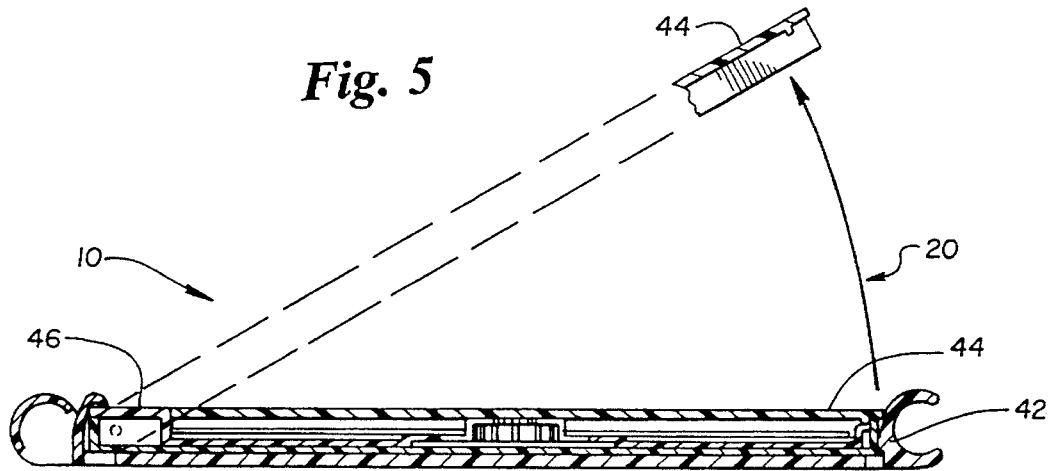
FIG. 5 is a section taken along line 5—5 of FIG. 3 and showing the compact disc cartridge cover opening.

In order to access a compact disc from compact disc cartridge 20, cover 44 must be moved from a closed position, as shown in FIG. 2, to an open position, as shown in FIGS. 5 and 6. The novel compact disc holder 10 of the present invention allows cover 44 to be opened without removing compact disc cartridge 20 from the compact disc holder 10.

Cover 44 is opened by applying an upward force to cover 44 at finger indentations 26. Cover 44 is hingedly connected to rear edge 46, and rotates about an axis along rear edge 46 when moving between an open position and a closed position. When cover 44 is opened, rear edge 46 remains stationary relative to cover 44.

As shown in FIGS. 5 and 6, hinge tab 40 and clip devices 42 retain compact disc cartridge 20 within compact disc holder 10. Cover 44 may be moved between an open position and a closed position, while hinge tab 40 and clip devices 42 retain the compact disc cartridge 20 within recessed area 18. Although cover 44 rotates about an axis along rear edge 46, rear edge 46 remains stationary and is retained within recessed area 18 by hinge tab 40. Since cover 44 does not extend down along the side wall 22 where clip devices 42 are located, the clip devices 42 retain compact disc cartridge 20 within the compact disc holder 10 without interfering with the operation of opening and closing cover 44.

The novel latch system of the present invention securely retains the compact disc cartridge within the compact disc holder. The compact disc cover is in full view, allowing an observer to read the information inserted in the compact disc cover regarding the medium contained on the enclosed compact disc. Unlike present rack or stack compact disc storage systems, the compact disc cartridge does not have to be removed from the compact disc storage device for viewing of the material contained within the compact disc cover.

Additionally, the present invention allows access to the compact disc, and information located within the compact disc cartridge without removal of the compact disc cartridge from the compact disc holder. One can gain access to the compact disc by simply applying upward pressure at the indentations 26 on the compact disc holder to open the compact disc cover. During this operation, the compact disc cartridge is securely retained within the compact disc holder.

The compact disc holder allows a compact disc to be easily inserted within the compact disc holder recessed area. The rear edge of the compact disc is first inserted beneath the compact disc holder hinge tab 40. Next, the compact disc cartridge is simply snapped into the compact disc holder recess area 18 with an opposite edge 48 being additionally retained in place by the compact disc clip devices 42. For removal of the compact disc cartridge from the compact disc holder, the operation is simply reversed.

The compact disc holder mating apparatus 16 are used for mating the compact disc holder with a plurality of other compact disc cartridge holders to form an array for use in a compact disc display. Mating apparatus 16 include dowels 60 and snaps 62. Compact disc holder 10, as shown, is generally rectangular shaped. Dowels 60 are located on edges opposite of snaps 62. The dowels 60 and snaps 62 are formed integral with the compact disc holder 10. The snaps 62 are generally C-shaped and formed to fit around the dowels 60.

A compact disc holder is mated with another compact disc holder by positioning the snaps of one compact disc holder around the corresponding dowels of another compact disc holder. The dowels are sized such that they may be rotatably received within the snaps. In that way, compact disc holders may be mated to form an array, while having the ability to be positioned at a wide range of angles relative to each other.

Dowels 60 include mating areas 64 and mounting areas 66. Snaps 62 connect to dowels 60 at mating areas 64. Dowels 60 are secured to the compact disc holder housing 12 at mounting areas 66.

The snaps 62 are either outward facing snaps 68 or rear facing snaps 70. Both outward facing snaps 68 and rear facing snaps 70 are generally arcuate and form a receptacle of a size corresponding to mating area 64. It is desirable to have both outward facing snaps and rear facing snaps for ease of mating a compact disc holder with a plurality of other compact disc holders to form various geometrical shapes and forms.

Figure 7:
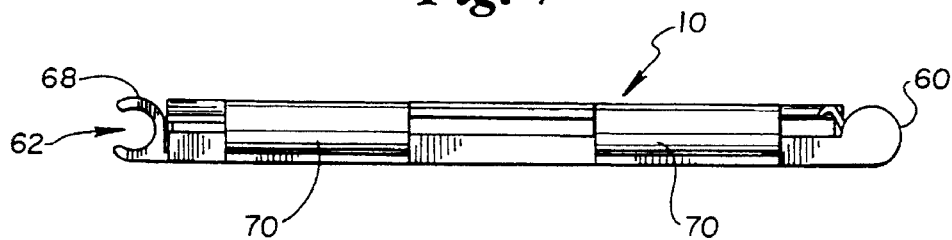
FIG. 7 is a side view taken long line 7—7 of FIG. 3.
Figure 8:
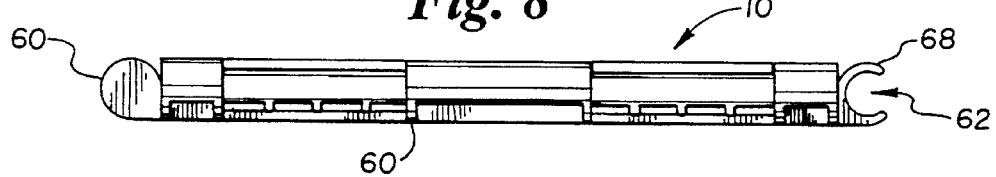
FIG. 8 is a side view taken along line 8—8 in FIG. 3.
Figure 9:
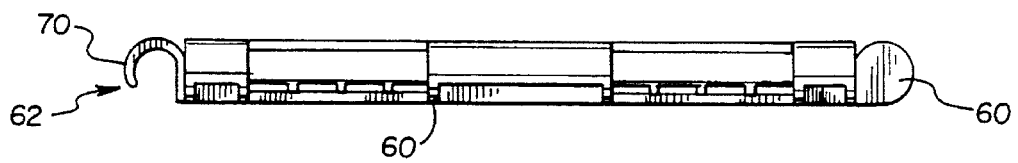
FIG. 9 is a side view taken along line 9—9 of FIG. 3.
Figure 10:
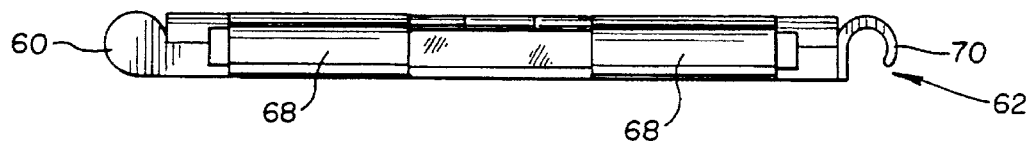
FIG. 10 is a side view taken along line 10—10 in FIG. 3.

FIGS. 7 and 8 show the general arcuate shape of outward facing snaps 68. FIGS. 9 and 10 show the general orientation and shape of rear facing snaps 70.

Figure 11:
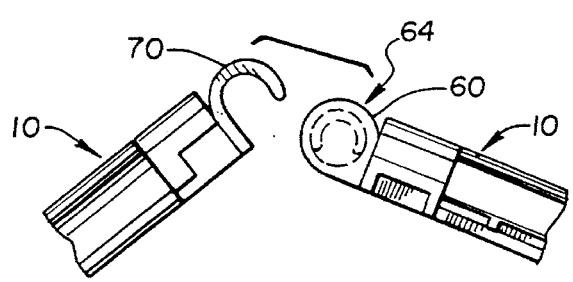
FIG. 11 is a fragmentary view showing one possible mating of two compact disc holders.

FIG. 11 shows the mating of two compact disc holders. Rear facing snap 70 is mated with another compact disc holder dowel 60. Rear facing snap 70 snaps around dowel 60 at mating area 64. Rear facing snap 70 is rotatably connected to dowel 60. Rear facing snap 70 fits over and rolls around the corresponding dowel 60. In operation, the mated compact disc holders may be located at a wide range of angles with respect to each other due to the rotatable connection of snaps 62 to dowels 60. In one embodiment, the mated compact disc holders can be oriented at 90° relative to one another to form a cube.

Figure 12:
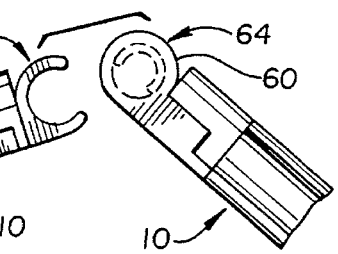
FIG. 12 is a fragmentary view showing another possible mating of two compact disc holders.

FIG. 12 shows another mating of two compact disc holders. In FIG. 12, outward facing snap 68 mates with corresponding dowel 60 of another compact disc holder 10. Outward facing snap 68 snaps and rolls around dowel 60 at mating area 64. The rotatable connection between outward facing snap 68 and dowel 60 allows the two compact disc holders to be located at a wide range of angles with respect to one another, and not be limited to being located in a common plane.

Figure 14:
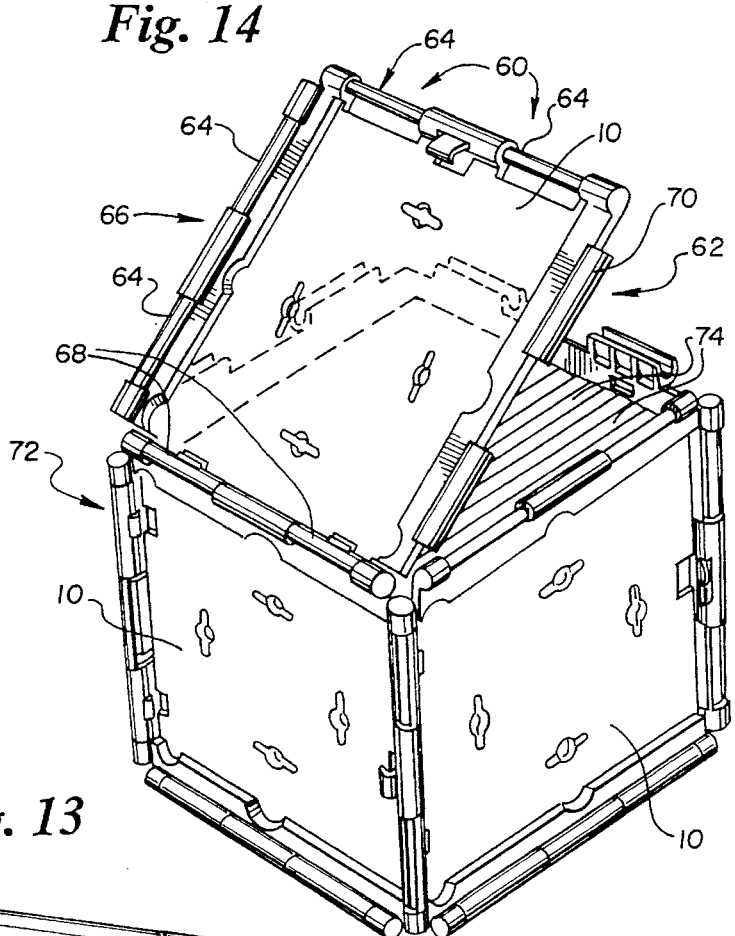
FIG. 14 is a perspective view of the assembly of FIG. 13 with a compact disc holder shown closing.
Figure 13:
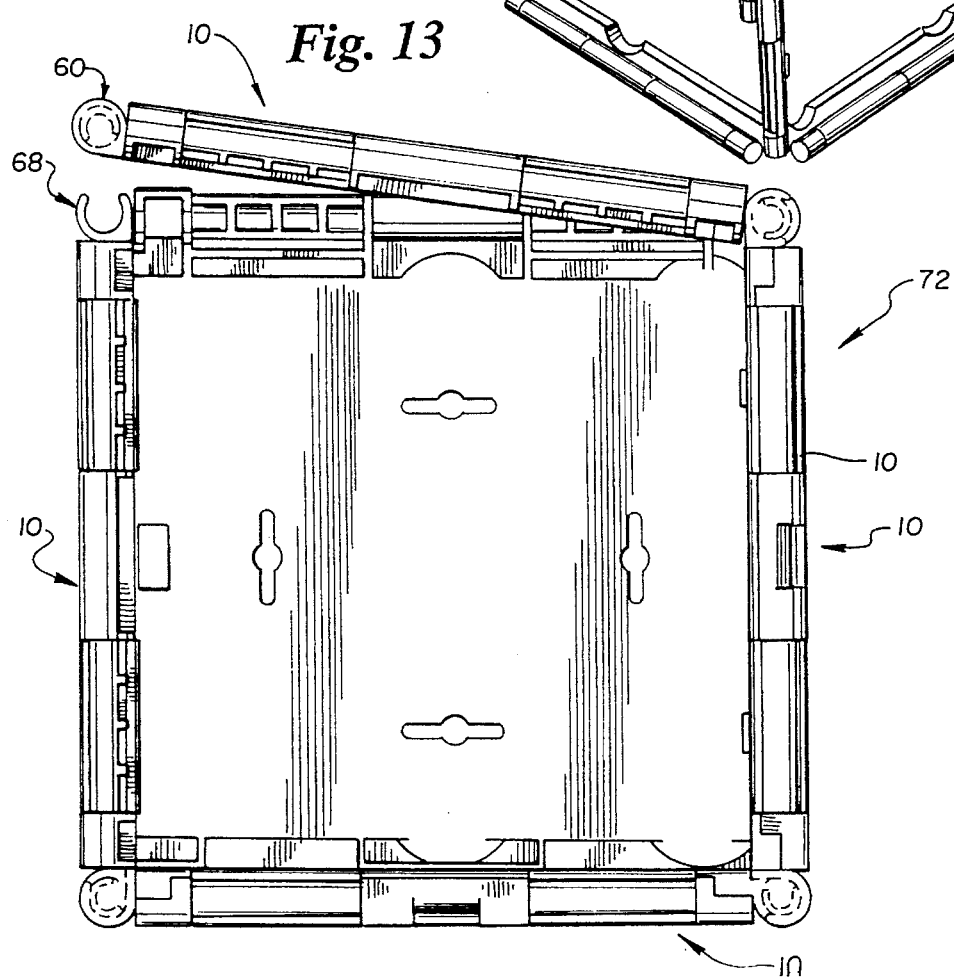
FIG. 13 is a top plan view of a simple cube formed by mating six compact disc holders together and wherein one compact disc holder is shown closing.

In the embodiment shown in FIGS. 13 and 14, a plurality of compact disc holders are connected in an array in the shape of a cube. As shown in FIGS. 13 and 14, a cube is formed by connecting together six compact disc holders 10, with each compact disc holder defining a side of the cube 72. In operation, the cube is easily formed by mating dowels of one compact disc holder with the corresponding snaps of another compact disc holder.

FIGS. 13 and 14 show the last compact disc holder 10 being located to form the cube 72. In accordance with this method, first rear facing snaps 68 are rotatably connected to a corresponding dowel 60 of a compact disc holder forming the side of the cube. The compact disc holder 10 is then rotated downward snapping outward facing snaps on a corresponding dowel 60, and snapping the dowels of compact disc holder 10 into corresponding outwardly facing snaps 68 of compact disc holders already in place on the side of the cube.

Upon completion of the cube 72, compact discs may be inserted into the compact disc holders to form an array for use as a compact disc display. Additionally, as shown in FIG. 14, the cube is sized such that additional compact discs 74 may be stored inside the compact disc display cube 72.

FIGS. 15–17 show the present invention formed in arrays which form various shapes and figures. FIG. 15 shows a box 80 formed of compact disc holders being mated together, with each side being formed from four compact disc holders. FIG. 16 is a cylindrical shaped array of compact disc holders shown at 82. Both FIGS. 15 and 16 may serve as compact disc displays which allow the compact discs to be easily viewed within the compact disc holders. The displays are freestanding and are not limited by unnecessary support systems.

FIG. 17 shows a staggered arrangement of compact disc holding devices at 84 located in an array in a common plane. Since each compact disc holder is identical, with corresponding dowel mating areas being sized for corresponding snaps, a staggered arrangement of compact disc holders such as shown in FIG. 17 may be constructed.

It is recognized that the novel compact disc holder of the present invention may be mated with other compact disc holders to form almost any desired shape or figure which may be used as a compact disc storage device or as a compact disc display unit.

As shown at 84 in FIGS. 15 through 17, regardless of the shape or form in which the compact disc holder array is constructed, each compact disc is easily opened without having to remove the compact disc cartridge from the compact disc array. Easy access to the compact disc allows a viewer to remove the compact disc or obtain access to the compact disc information inserted within a compact disc cover without removing the compact disc cartridge from the compact disc array.

It is recognized the compact disc holder may be sized to hold cartridges for other devices, such as computer diskettes, CD/ROM discs, and other storage mediums. The disc holders may be arranged in an array which takes on many shapes and forms for personal use and for use as a display device.

It will be understood that this disclosure is, in many respects, only illustrative. Changes may be made in details, particularly in matters of shape, size, material, and arrangement of parts, without exceeding the scope of the invention. Accordingly, the scope of the invention is as defined in the language of the appended claims.

What is claimed is:

1. A plurality of apparatus, each apparatus for holding a compact disc cartridge, each holding apparatus being capable of mating with a plurality of other compact disc cartridge holding apparatus to form an array for use in a compact disc display, each holding apparatus including:

a. a housing;

b. a recess located within the housing for receiving an individual compact disc cartridge;

c. means integral with the housing for releasably retaining the compact disc cartridge within the housing; and d. means integral with the housing for mating the compact disc cartridge holding apparatus with at least one other compact disc cartridge holding apparatus, wherein the mated holders can be oriented with respect to one another at a wide range of angles, wherein the mating means includes dowels and snaps, the dowels being located on opposite edges of the housing from the snaps, the dowels being formed to cooperate with the snaps for mating more than one holding apparatus together, and wherein the dowels of one holding apparatus cooperate with the snaps of another holding apparatus, the plurality of mated holding apparatus forming an array of holders, wherein each holding apparatus is rectangular shaped, and includes two dowels and two sets of snaps, the dowels and snaps being located on opposite edges of the holding apparatus.

2. The apparatus of claim 1, wherein the latch means includes tabs located at opposite ends of the holding apparatus.

3. The apparatus of claim 1, wherein a compact disc cartridge is retained in the holding apparatus and includes a rear edge, a cover, and a body, and wherein the latch means includes one tab extending at least partially over the compact disc cartridge rear edge and at least one tab located on an opposite side of the holding apparatus, which releasably retains the compact disc cartridge within the holding apparatus without interfering with the compact disc cartridge cover when it moves between open and closed positions.

4. The apparatus of claim 1, wherein the snaps fit over and roll around the corresponding mated dowel.

5. The apparatus of claim 1, wherein the plurality of mated holding apparatus form a three-dimensional shape.

6. The apparatus of claim 1, wherein the snaps are generally C-shaped, the snaps being sized for rotatable connection to a corresponding dowel.

7. The apparatus of claim 6, wherein each set of C-shaped snaps are orientated in a different direction.

\* \* \* \* \*